United States Patent

Kusters et al.

[15] 3,701,008

[45] Oct. 24, 1972

[54] PHANTOM BURDEN ARRANGEMENT FOR CURRENT TRANSFORMER CALIBRATION

[72] Inventors: Norbert L. Kusters; William J. M. Moore, both of Ottawa, Ontario, Canada

[73] Assignee: Canadian Patents and Development Limited, Ottawa, Ontario, Canada

[22] Filed: Aug. 16, 1971

[21] Appl. No.: 172,093

[52] U.S. Cl. ................................................. 324/55
[51] Int. Cl. .............................................. G01r 31/06
[58] Field of Search ........................................ 324/55

[56] References Cited

UNITED STATES PATENTS

| | | |
|---|---|---|
| 2,911,591 | 11/1959 | Pritchett ..................... 324/55 |
| 3,273,051 | 9/1966 | Povey et al. .............. 324/55 X |
| 3,359,488 | 12/1967 | Park ............................ 324/55 |
| 3,534,247 | 10/1970 | Miljanic .................. 324/55 X |

*Primary Examiner*—Gerard R. Strecker
*Attorney*—Richard K. Stevens et al.

[57] ABSTRACT

The power and reactive volt-amperes normally dissipated to furnish a burden are returned to the power supply either through a current comparator or an auxiliary current transformer. This effect is achieved by the use of an amplifier connected to generate a voltage that is an adjustable complex function of the secondary current of the calibration circuit, such voltage being applied across the secondary of the transformer undergoing calibration in order to furnish an effective burden therefor.

8 Claims, 4 Drawing Figures

PHANTOM BURDEN ARRANGEMENT FOR CURRENT TRANSFORMER CALIBRATION

This invention relates to means for realizing a given burden condition in a current transformer calibration circuit.

Traditional burdens now used for current transformer calibrations are dissipative, often generating up to 100 watts at the rated secondary current of 5 amperes for the largest standard burdens. Present practice requires calibration at 200 percent of rated current, and this may well be extended in the future to 400 percent. The corresponding dissipations, 400 watts and 1,600 watts, would be excessive.

One embodiment of the present invention described below represents an improvement over the circuits disclosed in N.L. Kusters et al U.S. Pat. No. 3,188,562 issued June 8, 1965, and more particularly an improvement over the compensated current comparator device illustrated in FIG. 5 of that patent. This same patent illustrates, in FIG. 3, a phantom burden for use in the current calibrating circuit. Such phantom burden represents an improvement over traditional burdens, in that it dissipates less power than a real burden. This prior arrangement has the disadvantage, however, that a manual adjustment is required to achieve a burden balance.

The object of the present invention is to provide a phantom burden arrangement for use in current transformer calibration circuits in which this disadvantage is avoided, while the advantage of a power dissipation lower than that of a real burden is retained.

Various embodiments of the present invention are illustrated in the accompanying drawings and in the description that follows. These circuits are provided by way of example only and not by way of limitation of the broad scope of the present invention, which latter is defined in the appended claims.

Figure 1:
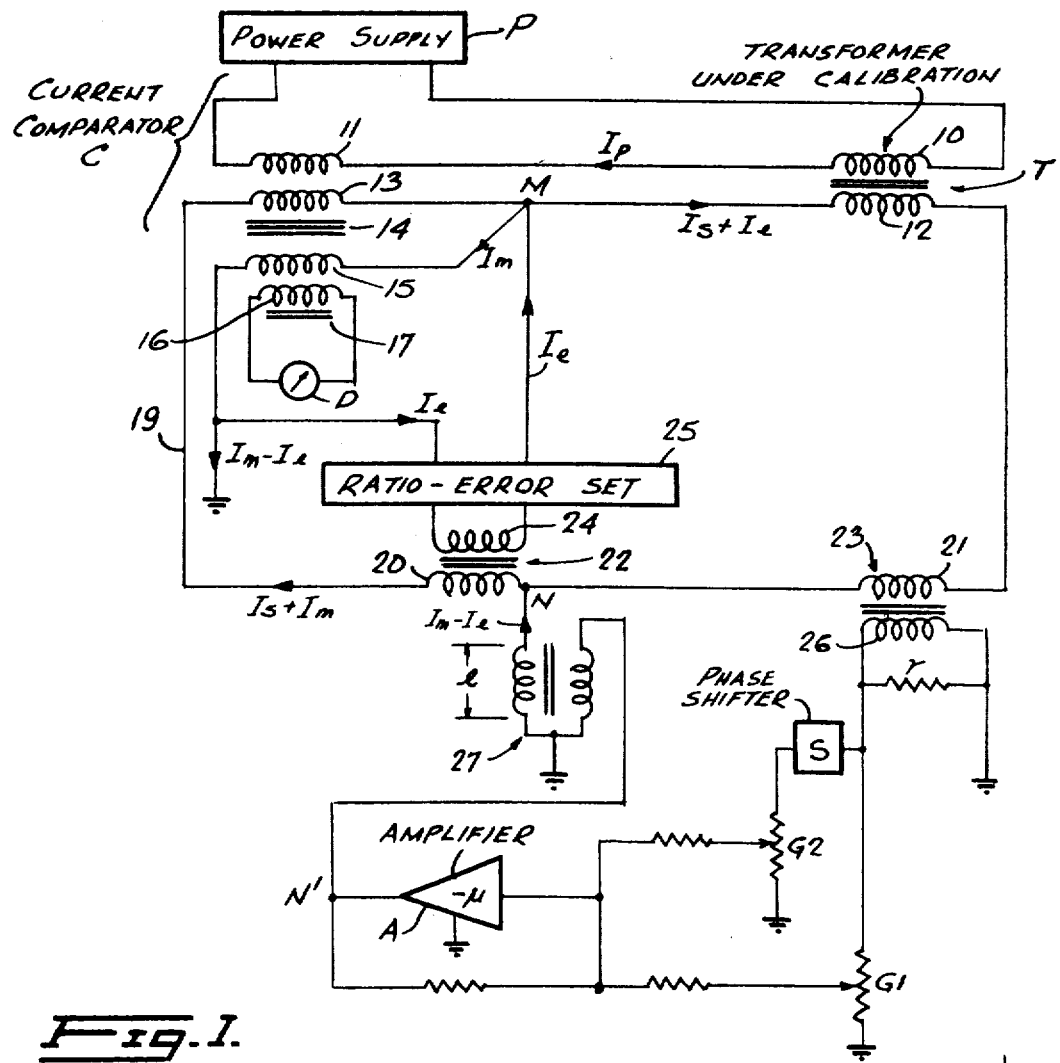
FIG. 1 is a circuit diagram showing the present invention applied to a current transformer calibration circuit using a compensated current comparator device of the type illustrated in said prior patent.

With reference to FIG. 1, there is shown a transformer T to be calibrated by means of a compensated current comparator device C and an associated circuit. The primary winding 10 of the transformer T is connected in series with a primary winding 11 of the comparator device C across a power supply P. The secondary winding 12 of the transformer T is connected in series with a secondary winding 13 of the comparator device C.

In addition to these windings, the comparator device C has an outer, laminated magnetic core 14, a compensation winding 15, a detection winding 16 and an inner, laminated magnetic core 17. The inner core 17 is at the axial center of the device, the detection winding 16, compensation winding 15 and outer core 14 being arranged radially outwardly in that order, with the primary and secondary windings 11, 13 outside the core 14. All the windings generate flux in the inner core 17, so that a zero reading on a null detector D connected across the detection winding 16 represents balance of the currents in the windings 11, 13 and 15. On the other hand, the outer core 14 is unaffected by current in the winding 15 which is positioned radially inwardly of it, the flux in the core 14 thus representing the sum of the currents in the windings 11 and 13. The compensation winding 15 is connected between ground and a point M between the windings 12 and 13, and must have the same number of turns as the winding 13.

The secondary circuit 19 including the windings 12 and 13 is completed through primary windings 20 and 21 of a pair of small power, current transformers 22 and 23, respectively. The secondary 24 of the transformer 22 provides an input to a ratio-error set 25, the output of which is applied between ground and the point M.

The ratio-error set 25 may take one of various possible forms. It will be basically an adjustable resistive-reactive network for generating an error current $I_e$ that bears a predetermined relationship to the current in the circuit 19. One example of a ratio-error set suitable for this purpose is illustrated in the above-mentioned patent. Alternatively, there may be used one of the ratio-error sets described in the paper of W.J.M. Moore and N.L. Kusters entitled "Direct Reading Ratio-Error Sets for the Calibration of Current Transformers" published in the IEEE Transactions on Instrumentation and Measurement, Volume IM-19, No. 3, August 1970.

Figure 1A:
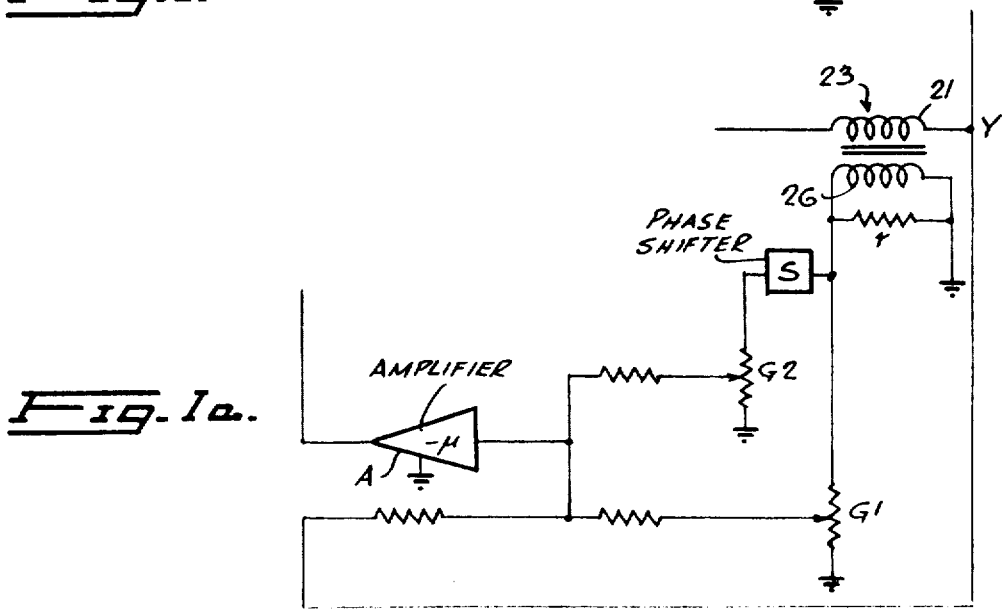
FIG. 1a is a fragment of FIG. 1 showing a modification.

The secondary 26 of the current transformer 23 is connected across a resistive burden r and also between ground and an amplifier A of negative $\mu$ gain, this connection to the amplifier A being established both as a direct, in-phase connection and through a 90° phase shifter S to provide a quadrature input. Gain controls G1 and G2 are also included. The output of the amplifier A acting through a transformer 27 generates a voltage e that is a linear but complex function of the current in the winding 21 and which is applied between ground and a point N located between the transformer windings 20 and 21. A third, feed-back input to the amplifier A is taken from point N' at the output of the amplifier. As is known, this negative feedback manner of connection insures a very stable overall circuit gain. Alternatively, this third input to the amplifier A can be brought from a point Y between the windings 12 and 21 (FIG. 1a), greater accuracy being achieved by connecting it to the point Y. This third input represents the active voltage which is to be controlled by the gain controls G1 and G2 and is fed back into the amplifier so that it may be compared with the desired voltage as determined by the settings of gain controls G1 and G2.

The primary current is assumed to be $I_p$, so that the secondary current generated in the transformer T is $I_s + I_e$, where $I_s$ is the ideal secondary current (i.e. $I_p = I_s$ assuming a nominal 1:1 ratio). $I_e$ is the transformer error current, which is the function to be determined when calibrating the transformer T. A compensation or magnetizing current $I_m$ flows in the windings 15, so that the current in the secondary winding 13 of the comparator device C and hence in the primary winding 20 of the transformer 22 is $I_s + I_m$.

The current in the primary 21 of the current transformer 23 is $I_s + I_e$, so that, for balance at the point N, the transformer 27 must supply a current $I_m - I_e$ at the point N.

The impedance of the winding 15 is low and the magnetizing current $I_m$ is small; hence point M is virtually at ground potential. Thus the voltage e applied between point N and ground appears across the winding 12 of transformer T. The burden of a current transformer is by definition the voltage across its secondary divided by the secondary current. Hence the burden on the transformer T is determined by the transfer function $e/(I_s + I_e)$. The power and reactive volt-amperes are returned to the supply P via windings 13 and 11 of the comparator device C, these windings acting with core 14 as a transformer without affecting the detector D.

In use, the gain controls G1, G2 are set to the value of the desired burden and the variable resistor and capacitor in the ratio-error set 25 are adjusted for a null reading on the detector D. The third input to the amplifier A is used to detect any deviation from the voltage e of the voltage across the winding 12, thus maintaining this latter voltage at its desired value. The settings in the ratio-error set 25 provide the desired information concerning the magnitude and phase of the error current $I_e$ in relation to the ideal secondary current $I_s$.

Figure 2:
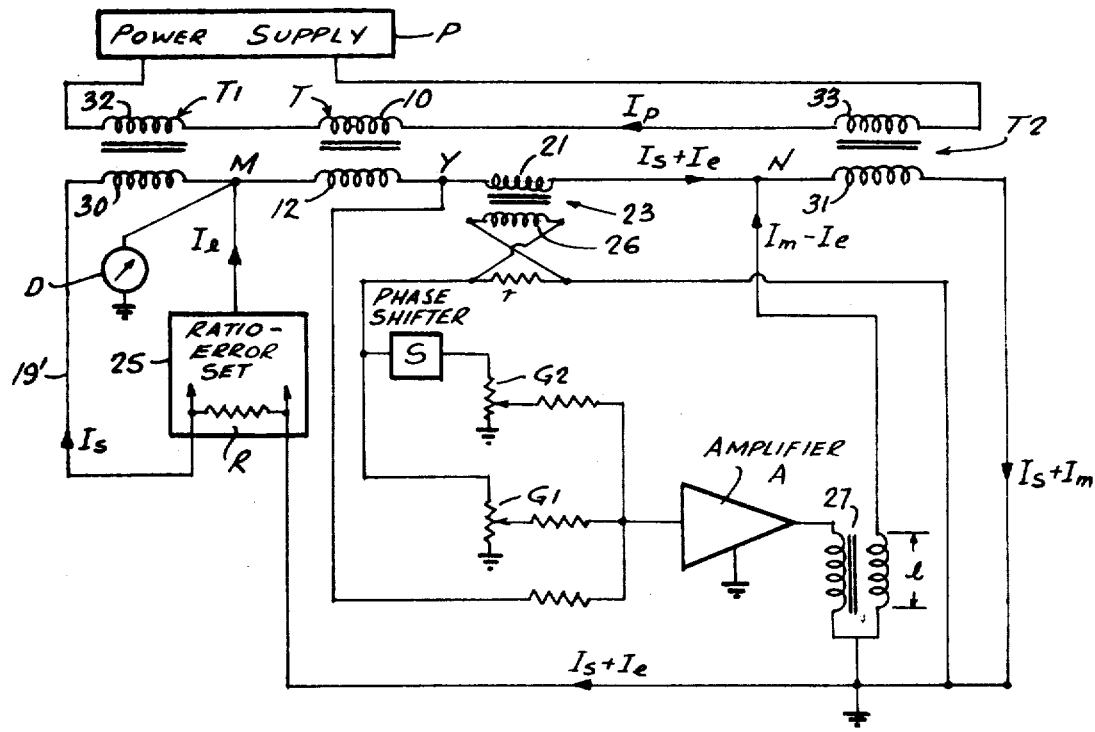
FIG. 2 is a circuit diagram showing the invention applied to a standard current transformer calibration circuit.

In FIG. 2 no comparator is used; instead the winding 12 of the transformer T to be calibrated is connected in a series secondary circuit 19' consisting of a secondary winding 30 of a standard current transformer T1, a secondary winding 31 of an auxiliary current transformer T2 and the winding 21 of the transformer 23. The primaries 32, 10 and 33 of transformers T1, T and T2 are series connected to the power supply P. In this case the standard and auxiliary current transformers T1 and T2 together constitute a so-called "second current transformer means," the "first" current transformer being the transformer T undergoing calibration.

The transformer 23 acts in essentially the same manner as in FIG. 1. A resistor R in the secondary circuit 19' provides an input to the ratio-error set 25 which, as before, feeds the error current $I_e$ to the point M. The amplifier A is also similarly connected in respect of both its inputs and output, the point N now being located between windings 21 and 31. The currents are shown on the circuit diagram. A null detector D connected between point M and ground is used to achieve balance.

In this embodiment the power and reactive volt-amperes are returned to the supply P through the auxiliary current transformer T2, while the current transformer T1 provides the necessary standard. Both these functions were performed in FIG. 1 by the compensated current comparator device C.

An advantage of the FIG. 2 circuit is that the input to the ratio error set need not necessarily be transformer coupled, as is necessary in FIG. 1. Such input can be a resistance in the secondary circuit, as shown in FIG. 2, or any other way of detecting the current in that circuit. This freedom enables use of any of the commercially available ratio-error sets in the FIG. 2 circuit, whereas with the FIG. 1 circuit it is essential to use a ratio-error set having a transformer coupled input.

Figure 2A:
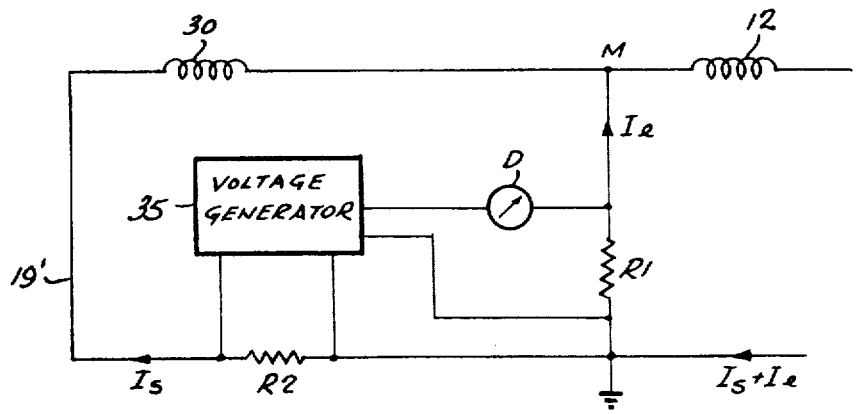
FIG. 2a is a fragment of FIG. 2 showing an alternative.

FIG. 2a shows an alternative to the FIG. 2 circuit. Instead of a ratio-error set generating an error current $I_e$, this current is simply allowed to flow in a direct connection between the point M and the grounded loop of the secondary circuit 19'. A resistor R1 in this connection generates a voltage $R1I_e$, which voltage is compared by detector D with a voltage generated in a voltage generator 35. Adjustments in the latter will be made until the detector D reads zero, whereupon the settings in the generator 35 will provide a measure of $I_e$, the quantity that it is desired to determine. An input to the voltage generator 35 from across a resistor R2 in the secondary circuit 19' provides such generator with a magnitude and phase reference.

Thus the means for generating an error current that is equal to the error current of the transformer under test (e.g. the ratio error set) has been replaced in the FIG. 2a circuit by means for generating an error signal of a different type. In this case the error signal consists of a voltage that is equal to the drop across a resistor produced by the error current.

We claim:

1. Means for realizing a given burden condition in a current transformer calibration circuit including a secondary circuit containing the secondary winding of the current transformer to be calibrated; comprising amplifier means for generating a voltage proportional to the current in said secondary circuit, and means for applying said voltage across said secondary winding to form a phantom burden arrangement therefor.

2. Means according to claim 1, including means for controlling the magnitude and phase of said voltage in relation to the secondary circuit current.

3. Means for realizing a given burden condition on a first current transformer in a calibration circuit, comprising
 a. second current transformer means,
 b. means connecting primary windings of said first current transformer and said second current transformer means in series with each other and a power supply to form a primary circuit,
 c. means connecting secondary windings of said first current transformer and said second current transformer means in series with each other to form a secondary circuit,
 d. means for measuring the error current of the first transformer,
 e. amplifier means for generating a voltage proportional to the current in the secondary circuit, including means for controlling the magnitude and phase of such voltage in relation to said secondary circuit current,
 f. and means for applying said voltage across the secondary winding of the first transformer whereby to form a phantom burden arrangement therefor.

4. Means according to claim 3,
 g. wherein said second current transformer means (a) comprises a compensated current comparator device, and
 h. wherein said measuring means (d) comprises means for injecting a current equal to the error current of the first current transformer into the secondary circuit between the secondary winding of said first current transformer and a secondary winding of said current comparator device.

5. Means according to claim 3, g. wherein said second current transformer means (a) comprises a standard current transformer and an auxiliary current transformer, and
h. wherein said measuring means (d) comprises means for injecting a current equal to the error current of the first current transformer into the secondary circuit between the secondary winding of said first current transformer and the secondary winding of said standard current transformer.

6. Means according to claim 3,
g. wherein said second current transformer means (a) comprises a standard current transformer and an auxiliary current transformer, and
h. wherein said measuring means (d) comprises means enabling a current equal to the error current of the first current transformer to flow into the secondary circuit between the secondary winding of said first current transformer and the secondary winding of said standard current transformer, and means for measuring a voltage proportional to said error current.

7. Means according to claim 3, including a feed-back input to said amplifier means.

8. Means according to claim 7, wherein said feed-back input is connected to represent the voltage across the secondary winding of the first current transformer.

* * * * *